(12) United States Patent
Reck

(10) Patent No.: US 7,198,317 B2
(45) Date of Patent: Apr. 3, 2007

(54) ADJUSTABLE VEHICLE ROOF HAVING A FABRIC COVER

(75) Inventor: Phillip Reck, Leonberg (DE)

(73) Assignee: CTS Fahrzeug-Dachsysteme GmbH, Hamburg (DE)

( * ) Notice: Subject to any disclaimer, the term of this patent is extended or adjusted under 35 U.S.C. 154(b) by 0 days.

(21) Appl. No.: 11/282,008

(22) Filed: Nov. 17, 2005

(65) Prior Publication Data
US 2006/0131924 A1 Jun. 22, 2006

(30) Foreign Application Priority Data
Nov. 19, 2004 (DE) .................... 10 2004 055 991

(51) Int. Cl.
B60J 1/00 (2006.01)
(52) U.S. Cl. ............................ 296/107.07; 296/146.14
(58) Field of Classification Search ........... 296/107.07, 296/146.14
See application file for complete search history.

(56) References Cited

U.S. PATENT DOCUMENTS 4,572,570 A * 2/1986 Trucco .................. 296/107.07

FOREIGN PATENT DOCUMENTS

DE 37 26 430 C1 9/1988

* cited by examiner

Primary Examiner—Joseph D. Pape
(74) Attorney, Agent, or Firm—Brooks Kushman P.C.

(57) ABSTRACT

An adjustable vehicle roof has a flexible cover supported by a cover rod assembly that may be moved between a raised position and a stored position. The cover rod assembly includes a first arch and a second arch. A rigid rear window is integrated into the cover material. The rear window is stored between the first support element and the second support element in the stored position.

17 Claims, 1 Drawing Sheet

ADJUSTABLE VEHICLE ROOF HAVING A FABRIC COVER

CROSS-REFERENCE TO RELATED APPLICATIONS

This application claims priority to German application no. 102004055991.0, filed Nov. 19, 2004.

BACKGROUND OF THE INVENTION

1. Field of the Invention

The invention relates to an adjustable vehicle roof made of a fabric material.

2. Background Art

Vehicles with convertible tops have been made and sold in the automotive industry for decades. Many of such vehicles have convertible tops made from fabric.

One problem encountered when designing tops made from fabric is the difficulty in ensuring that the fold in the fabric occurs in approximately the same location each time the top is lowered. Controlling the location of the fold allows the designer to plan where the rear window will rest when the convertible top is in the stored position. Prior art solutions to this problem have been complicated and include, in some instances, the use of tucker elements and compression rods, adding weight, increasing complexity and consuming limited storage space.

There is a need in the automotive industry for a convertible car top having an uncomplicated design which controls the location of the fold in the fabric and which can be stored in a relatively compact space. The present invention fulfills these needs, as summarized below.

SUMMARY OF THE INVENTION

The invention relates to a convertible vehicle roof made of fabric. According to the present invention, a vehicle roof that is adjustable between a raised position and a stored position is provided having a fabric cover material, a rod assembly and a rear window. The fabric cover material incorporates the rear window and is supported by the rod assembly. The fabric cover material is connected at one end to the vehicle near the rear of the passenger compartment and is removably connected at the other end to some portion of the vehicle forward of the rear attachment location, typically the top of the vehicle's windshield.

The rod assembly is made of a first support element and a second support element, each support element having a first and second end. The first end of the first support element is adapted to be attached to the vehicle in a manner which allows it to articulate forward and rearward with respect to the vehicle. The attachment may be through a kinematic control system that articulates the first support element from its stored position to its raised position or vice versa. The second end of the first support element is connected to the fabric cover material and supports it when the vehicle's roof is in the raised position. The second support element is located behind the first support element with respect to the front of the vehicle. The first end of the second support element is adapted to be attached to the vehicle in a manner which allows it to articulate in the forward and rearward direction with respect to the vehicle. The second end of the second support element supports the fabric cover material when the vehicle roof is in the raised position. When the rod assembly is in its raised position, the vehicle roof is in the raised position and the first support element, in cooperation with the second control element, may stretch the roof's fabric cover material taught. When the vehicle roof is in the stored position, the fabric cover material folds so that the rear window is disposed between the first and second support elements.

In another embodiment, the vehicle roof includes a spring element which engages the second support element and biases it to articulate towards its stored position. In another embodiment, the roof has a tension element connecting the first support element to the second support element such that the tension element is relaxed when the vehicle roof is in the stored position and in tension when the vehicle roof is in the raised position.

In another embodiment, the rear window is pivotably supported to facilitate its disposition in between the first support element and the second support element when the vehicle roof's is in the stored position. Such pivotable support may be a rotary joint which is rigidly attached to the vehicle. The window itself may also be rigid.

In another embodiment, the first and second support elements may articulate independently of one another. Accordingly, the angle between the first and second support elements may be smaller when the vehicle roof is in the stored position than it is when the vehicle roof is in the raised position.

In another embodiment, the vehicle roof includes a kinematic control system that controls the articulation of the first support element.

In yet another embodiment, the second support element is supported in an articulated manner on the kinematic control system.

When the vehicle roof is raised, the first support element is swivelled out, either manually or by a kinematic control system, from the stored position to the raised position, while at the same time the second support element, which may be directly or indirectly connected to the first support element via tensioning elements, is likewise moved into a swivelled-out position. During the folding-away motion the second support element, either with the assistance of suitable control elements such as a spring element or an actuator or by its own intrinsic weight, is once again moved to the stored position in the rear of the vehicle.

According to the invention, when in the stored position, the rear window is disposed between the first and second support elements. The second support element is located behind the first support element with respect to the front of the vehicle, and therefore situated nearer to the rear of the vehicle, when the roof is in a horizontal or at least approximately horizontal stored position, the second support element is bottommost, the rear window is in the middle, and the first support element is above the rear window, thereby providing a compact storage space. The folding-away motion of the rear window occurs analogously to that of the second support element, either by the intrinsic weight of the rear window or by appropriate control elements, as a function of the motion of the first support element. The fabric cover material, which is connected to the rear window, is likewise automatically inserted into the interspace between the first support element and the second support element by the folding-away motion of the rear window. The fabric cover material has a fold imposed on it because on one side, it is connected to the upper edge of the rear window, and on the other side it is connected to the first support element. A reliable and defined folding action is provided that can be performed over long operating periods because the upper edge of the rear window is stored between the first support element and the second support element.

The second support element may be engaged by a spring element, by which the second support element is biased in the direction of its stored position. The second support element may also be coupled to the first support element via a tensioning element. The first support element's motion is fixed by kinematic means and achieves both the closing motion and the folding-away motion. When the vehicle roof is stored, the first support element is moved downward toward the stored position, thereby relaxing the tension in the tensioning element, and the second support element, under either the action of the spring element or by its intrinsic weight or both, is likewise moved toward the stored position. Conversely, during the closing motion of the vehicle roof the second support element is raised up by the motion of the first support element, against the force of the spring element with the assistance of the tensioning element.

As an alternative to the embodiment with the spring element or the tensioning element, a kinematically force-controlled motion may also be employed by coupling the second support element to the first support element or to the first element's kinematic control system.

When the vehicle roof is stored, the rear window undergoes a swivel motion from its raised position to its lowered position. This swivel motion may be achieved by an articulated connection of the rear window to the vehicle body through a rotary joint that engages with the window frame. During the swivel motion, the rear window is swivelled into the interspace between the second support element and the first support element.

The second support element may change its angular position with respect to the first support element, so that in the stored position a relative angle is established between these two components which is different from that in the raised position of the vehicle roof. To accomplish this, second support element may be pivotably coupled via its own rotary joint, either to the vehicle body or to the first support element or to the kinematic control system for first support element. When the second support element is acted on by the spring element and the tensioning element, the second support element changes its relative angular position with respect to the first support element as soon as the particular end position is vacated and the vehicle roof is moved in the direction of the oppositely situated end position.

DETAILED DESCRIPTION OF THE PREFERRED EMBODIMENT(S)

Figure 1:
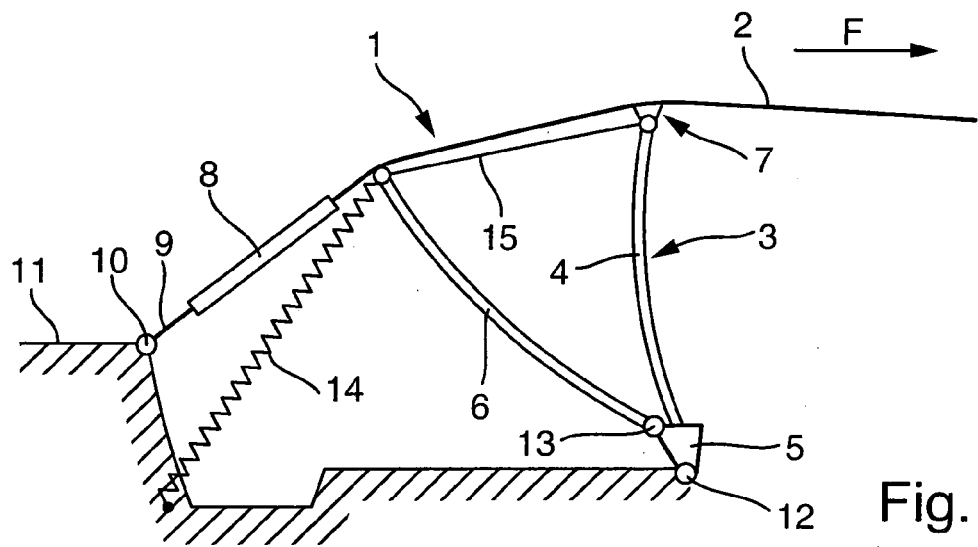
FIG. 1 is a cross sectional view of the vehicle roof in the raised position.
Figure 2:
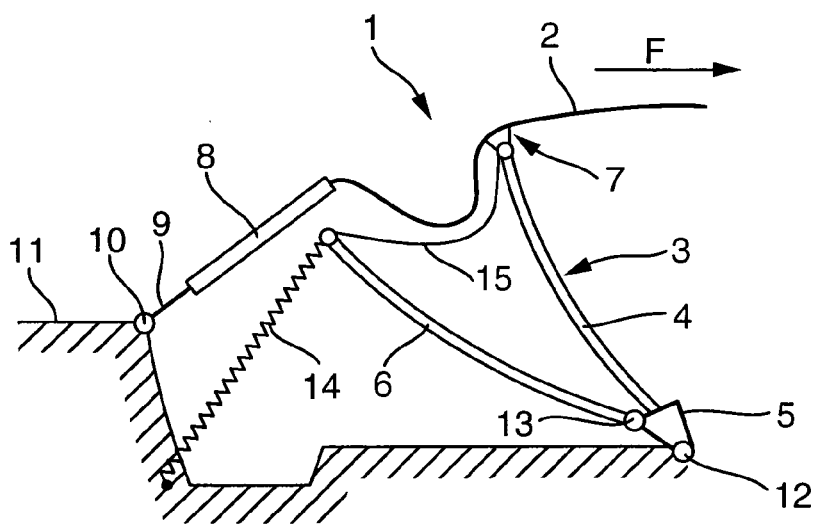
FIG. 2 is a cross sectional view of the vehicle roof in an intermediate position between the raised and stored position.
Figure 3:
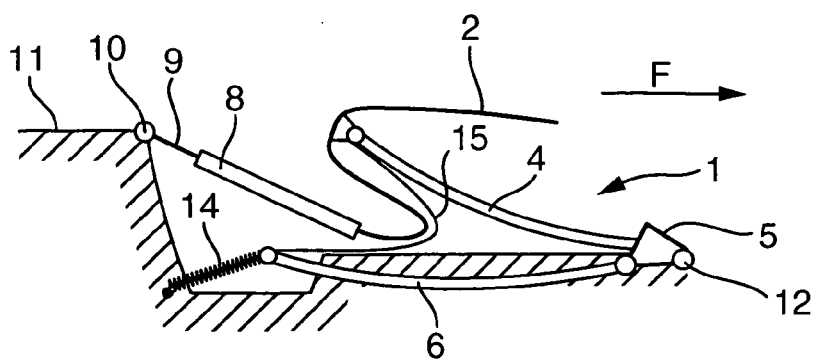
FIG. 3 is a cross sectional view of the vehicle roof in the stored position.

As shown in FIGS. 1 through 3, an adjustable vehicle roof made of a fabric material is illustrated. In FIG. 1, the vehicle roof 1 is shown in the raised position. It includes a fabric cover material 2 and a rod assembly 3 having a first support element 4 and a second support element 6 by which the cover material 2 is supported. The first support element 4 is pivotably connected to the vehicle body 11 via a kinematic control system 5, and is to be articulated from the raised position illustrated in FIG. 1, via the intermediate position illustrated in FIG. 2, to the stored position illustrated in FIG. 3. The kinematic control system 5 is pivotably coupled to the vehicle body 11 via a rotary joint 12. While a rotary joint is illustrated, it should be understood that any suitable kinematic connection of the first support element to the vehicle body may be utilized.

The position of the front of the vehicle is indicated in FIGS. 1 through 3 with an "F" and an adjacent arrow. The second support element 6 is situated behind the first support element 4, with respect to the front of the vehicle. The second support element 6 is pivotably connected to the kinematic control system 5 of the first support element via a rotary joint 13. The second support element 6 is not acted on directly by the actuator, but instead articulates as a function of the motion of the first support element 4. This motion coupling is achieved by a tensioning element 15 which, as a deformable connecting element, is situated between the first support element 4 and the second support element 6 and through which a tensile force is transmittable between the first support element 4 and the second support element 6. The tensioning element 15 holds the second support element 6 in its raised position when the vehicle roof is in the raised position.

One end of spring element 14 engages with the second support element 6. The other end of spring element 14 is connected to the vehicle body 11, and acts on the second support element 6 with a tensile force that biases the second support element 6 in the direction of its stored position. The second support element 6 is thereby held upright in the raised position by the tensioning element 15, and at the same time the second support element 6 is acted on by the spring element 14 with a force in the opposite direction biasing it towards the stored position.

The first support element 4 may be connected to the cover material 2 via a connection 7. The second support element 6 contacts and supports the cover material when the roof is in the raised position, but has no connection to the cover material 2.

In the rear region a rear window 8 is integrated into the cover material 2, and may be a solid, intrinsically rigid plate made of glass or other material. The rear window 8 is pivotably connected to the vehicle body 11 via a rigid coupling element 9, for example a rear window frame, and a rotary joint 10. By means of this pivotable mounting, the rear window 8 can be swivelled from its oblique raised position as shown in FIG. 1 to its lowered stored position in the storage compartment as shown in FIG. 3. When the vehicle roof is raised, the cover material 2 in which the rear window 8 is embedded acts on the rear window with a restraining tension which holds the rear window in the obliquely raised position.

The coupling element 9 and the rotary joint 10 may optionally be omitted. When the coupling element 9 and the rotary joint 10 are omitted, the rear window 8 may be guided by its upper edge to achieve a folding-away motion. A "soft" connection of the rear window 8 to the vehicle body 11 via only the cover material 2, without other coupling and rotary elements, may be sufficient. During the folding-away motion the second support element 6 is relieved of the tension force from the tensioning element 15 more quickly than is the cover material 2, so that the second support element 6 is already positioned beneath the rear window 8 when the rear window 8 is stored.

The intermediate position illustrated in FIG. 2 is traversed during the folding-away motion of the vehicle roof 1. The first support element 4, which is actuated by the kinematic control system 5, has already been swivelled from its upright raised position slightly to the rear towards the stored position, thereby reducing the fabric tension in the cover material 2. The second support element 6 can be swivelled via the rotary joint 13 independently of the first support element 4. The second support element may perform its own swivel motion in the direction of the storage compartment as the result of the reduced tension in the tensioning element 15 under the influence of either the spring element 14, a suitable kinematic control system or by its own intrinsic weight. The relative angular position between the first support element 4 and the second support element 6 varies because the second support element 6 is free to swivel independently of the first support element 4. As the vehicle roof comes to rest in the stored position, the angle between the first and second support elements narrows.

Because of the relaxation of the cover material 2, the rear window 8 also drops downward under the influence of its intrinsic weight, and its front section reaches the interspace between the first support element 4 and the second support element 6. Additionally, the portion of the cover material 2 between the upper edge of the rear window 8 and the connection 7 is stored with the formation of a fold in the interspace between the second support element 6 and the first support element 4. This folding action occurs in particular as a result of the upper edge of the rear window 8 being forcefully moved into the interspace. However, the folding action may also be supported by an additional tucker such as a spring element, for example.

As shown in FIG. 3, the vehicle roof 1 is in its stored position. The upper section of the rear window 8 is folded away in the interspace between the first support element 4 and the second support element 6, as is the portion of the cover material 2 that is adjacent to the upper edge of the rear window 8. The tensioning belt 15 is also disposed between the second support element 6 and the first support element 4. It is possible for a larger or smaller portion of the rear window 8 to be stored in the interspace between the first support element 4 and the second support element 6. When the vehicle roof is in its stored position, the second support element 6 is in the bottommost location, in an approximately horizontal position, and the first support element 4 rests on the rear window 8 and likewise assumes an approximately horizontal position with a small relative angle with respect to the second support element 6.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An adjustable vehicle roof having a flexible cover that may be moved between a closed position and a stored position, the roof comprising:
    a cover rod assembly having a main arch which is articulately fixed to the vehicle body, and a corner arch articulately supported on the vehicle body, the main arch being located in front of the corner arch in the longitudinal direction of the vehicle when the vehicle roof is closed;
    a cover supported by the cover rod assembly and having a rear window that is integrated into the cover; and
    wherein the rear window in the stored position is stored between the corner arch and the main arch.

2. Vehicle roof according to claim 1 further comprising a spring element that engages the corner arch and biases the corner arch in the direction of the stored position.

3. Vehicle roof according to claim 2 wherein the spring element is attached to the vehicle body.

4. Vehicle roof according to claim 1 wherein the corner arch is connected to the main arch via a tensioning belt, the tensioning belt being tensioned when the vehicle roof is in the closed position and holding the corner arch in a raised position.

5. Vehicle roof according to claims 1 wherein the rear window is pivotably supported.

6. Vehicle roof according to claim 5 wherein the rear window is pivotably supported about a rotary joint which is rigidly attached to the body and faces toward the rear of the vehicle.

7. Vehicle roof according to claim 1 wherein the rear window is intrinsically rigid.

8. Vehicle roof according to claim 1 further comprising a kinematic control system for the main arch that supports the corner arch in an articulated manner on the main arch.

9. A roof for a vehicle having a passenger compartment, the roof being adjustable between a raised position and a stored position, the roof comprising:
    a flexible cover having a back portion that is attached to the vehicle proximate a rear portion of the passenger compartment, the cover having a front portion that may be selectively attached to the vehicle at a location forward of the rear attachment location;
    a rod assembly having a first arch secured to the vehicle in an articulated manner to be movable in a forward and rearward direction relative to the vehicle, the first arch supporting the flexible cover material when the roof is in the raised position, the rod assembly having a second arch that is disposed behind the first arch and is secured to the vehicle in an articulated manner to be movable in a forward and rearward direction relative to the vehicle, the second arch supporting the flexible cover when the roof is in the raised position; and
    a rear window integrally secured to the flexible cover, wherein the rear window is disposed between the first and second arches when the vehicle roof is in the stored position.

10. The roof of claim 9 further comprising a spring element engaging the second arch that biases the second arch towards the position of the second arch when the roof is in the stored position.

11. The roof of claim 9 further comprising a tension element that connects the first arch to the second arch, wherein the tension element is in tension when the vehicle roof is in the raised position and wherein the tension element holds the second arch in the raised position.

12. The roof of claim 9 wherein the rear window is pivotably supported relative to the vehicle.

13. The roof of claim 9 wherein the rear window is pivotably supported by a rotary joint that is rigidly attached to the vehicle.

14. The roof of claim 9 wherein the window is rigid.

15. The roof of claim 9 wherein the first arch and the second arch are articulated independently of one another.

16. The roof of claim 9 further comprising a kinematic control system that controls articulation of the first arch.

17. The roof of claim 16 wherein the second arch is supported in an articulated manner on the kinematic control system.

* * * * *